H. B. IRVIN & P. M. BONNEAU.
ATTACHMENT FOR COTTON COMPRESSORS.
APPLICATION FILED SEPT. 12, 1917.
1,293,452.
Patented Feb. 4, 1919.
2 SHEETS—SHEET 1.
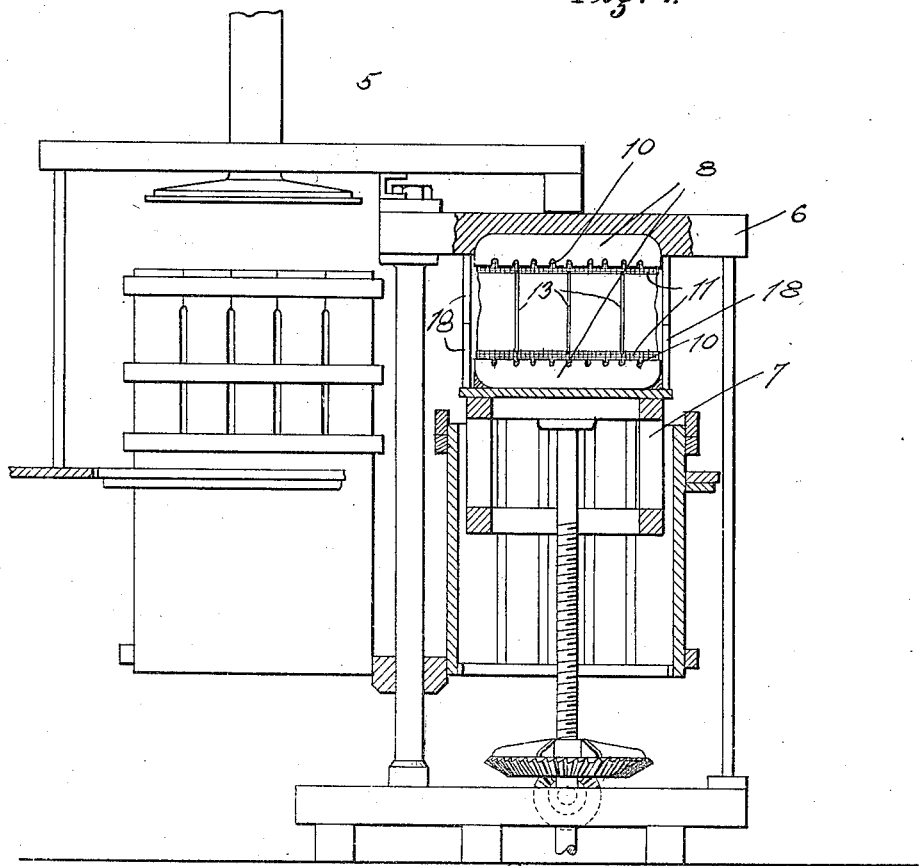
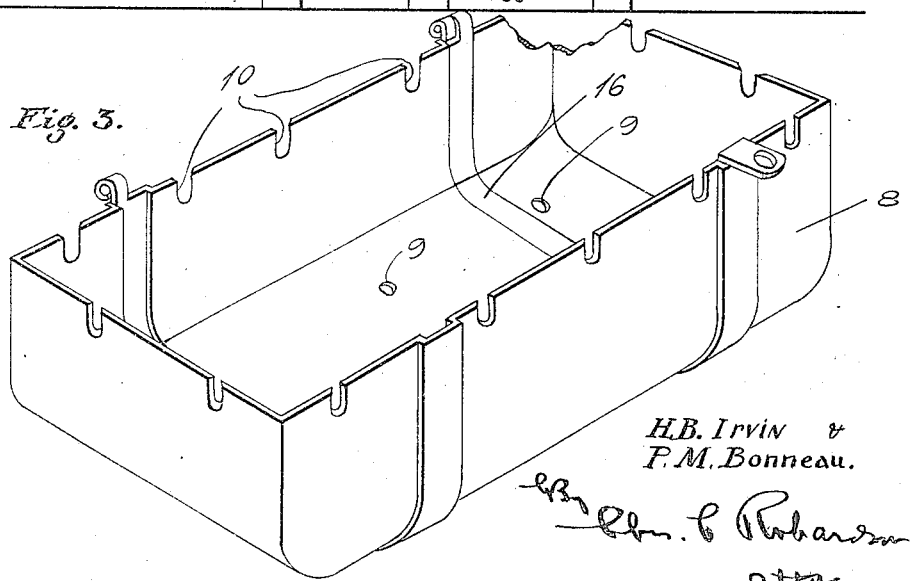
H. B. Irvin &
P. M. Bonneau.

H. B. IRVIN & P. M. BONNEAU.
ATTACHMENT FOR COTTON COMPRESSORS.
APPLICATION FILED SEPT. 12, 1917.
1,293,452.
Patented Feb. 4, 1919.
2 SHEETS—SHEET 2.
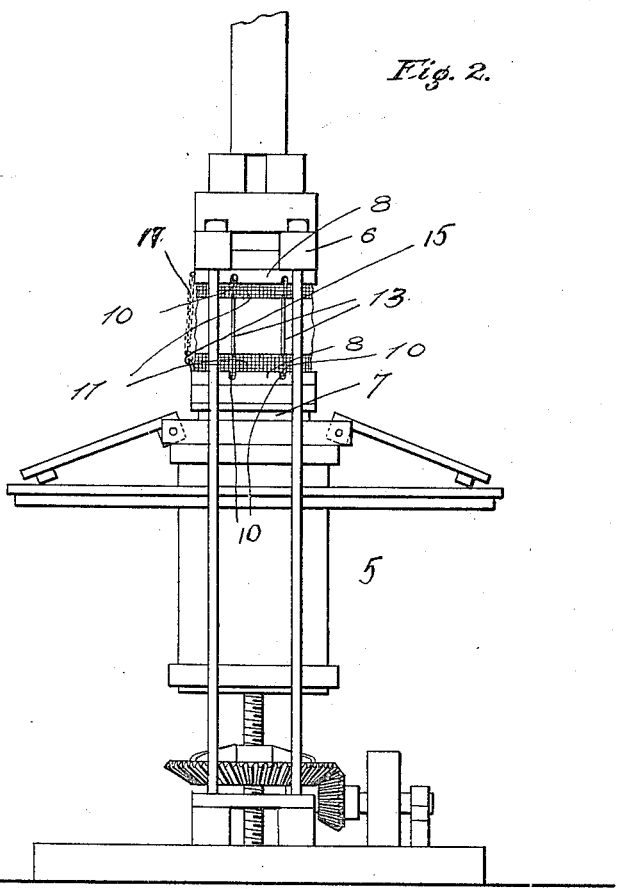
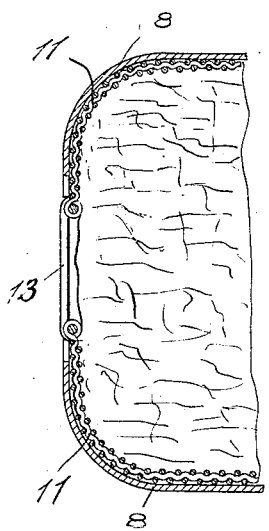
INVENTORS:—
H. B. Irvin &
P. M. Bonneau.

UNITED STATES PATENT OFFICE.

HENRY B. IRVIN AND PETER M. BONNEAU, OF DURANT, OKLAHOMA.

ATTACHMENT FOR COTTON-COMPRESSORS.

1,293,452.	Specification of Letters Patent.	Patented Feb. 4, 1919.

Application filed September 12, 1917. Serial No. 190,990.

*To all whom it may concern:*

Be it known that we, HENRY B. IRVIN and PETER M. BONNEAU, citizens of the United States, residing at Durant, in the county of Bryan and State of Oklahoma, have invented certain new and useful Improvements in Attachments for Cotton-Compressors, of which the following is a specification.

This invention relates to an attachment for cotton bale compressing machines and has as its object to provide means for confining the sections of a crate, during the operation of compressing the bale, which crate is designed to encompass the compressed bale and forms the subject-matter of an application filed by Henry B. Irvin, September 10, 1917, Serial No. 190,535. The object of the invention is the provision, as stated, of means for confining the crate sections, which means will serve to effectually maintain the shape of the sections during the operation of compressing the bale so that the walls of the sections will not be liable to be outwardly bulged and thereby interfere with the application of means which is provided for connecting the sections after the bale has been compressed.

Another object of the invention is to provide in connection with the attachment, means for automatically ejecting the crate and bale compressed therein after the compressing operation and as the movable head of the compressor recedes from the fixed head thereof.

With the above and other objects in view the present invention resides in the novel features of construction, formations, combinations and arrangements of parts to be hereinafter more fully described, claimed, and illustrated in the accompanying drawings forming a part of the present application and in which—

Figure 1 is a side elevation of a cotton compressor partly in section and showing our improvements applied thereto;

Fig. 2 is a similar view looking at one end of the machine;

Fig. 3 is a detail perspective view of one of the trays removed; and

Fig. 4 is a transverse sectional view taken through a portion of one of the trays showing the bale and crate therein in its compressed state.

Referring now to the accompanying drawings by corresponding characters of reference throughout the several views, the numeral 5 designates in general a portion of a cotton compressor or the like. As any form of compressor can be used the present drawings illustrate the same in conventional form only and a detail description thereof is not deemed necessary.

However, the stationary head of the compressor is shown at 6 and the movable head is shown at 7.

The device of the present invention comprises a pair of counter part trays 8 which are secured in the heads 6 and 7, the trays 8 being preferably formed with bolt openings 9 through which bolts or other suitable fastening devices may be passed for the purpose of securing said trays to the heads 6 and 7.

The trays are provided at suitable intervals in their edges with notches 10 which serve a purpose to be later explained.

In use one reticulated section 11 of the crate, containing the bale of cotton to be compressed is placed in the lower tray 8 while the other section is placed over the bale.

The lower or movable head 7 is then forced upwardly and the opposite sides of the bale are shaped by pressure to conform to the shape of the trays 8.

Suitable hooks 13 are then used to connect the edges of the bale sections and in order to facilitate such work, the hooks may be passed through the slots 10 in the trays. After these crate sections are thus secured the hooks 15 connected by chains 17 or the like with the fixed upper head 6 or some other convenient fixed portion of the compressor are engaged with the ends of discharging members 16 pivoted or hinged in recesses formed in the walls of the lower tray. When the lower head is moved downwardly, the discharging members will be swung upon their hinges so as to overturn and discharge the bale from the lower tray 8.

Suitable stops 18 are provided to limit the movement of the heads relative to each other.

Having thus fully described the invention what we claim is new and desire to protect by Letters Patent is;

1. In a device of the class described, the combination with coacting press heads, of means upon each head for receiving a crate section and restraining the sides and ends thereof.

2. In a device of the class described, the combination with coacting press heads, of means carried by each head for encompassing and restraining the side and end walls of an open sided crate section to be acted upon by the head.

3. In a device of the class described, the combination with coacting press heads, of a crate section receiving member carried by each head and having walls designed to encompass and restrain all of the walls of the respective crate section.

4. The combination with coacting press heads one of which is movable with relation to the other, of means upon each head for encompassing a crate section, and ejecting means associated with the first-mentioned means upon one of the heads and operatively connected with the other head.

5. In a device for compressing bales of cotton or the like and confining them between the sections of a crate, the combination with coacting press heads one of which is movable with relation to the other, of means upon each head for encompassing a crate section, and means actuated through the separation of the heads for ejecting the compressed bale and its crate.

6. In a device for compressing bales of cotton or the like and confining them between the sections of a crate, the combination with coacting press heads one of which is movable with relation to the other, of a tray upon each head designed to receive a section of the crate, and ejecting means operating within one of the trays and actuated through separation of the said press heads to eject the compressed bale and its crate.

7. In a device for compressing bales of cotton or the like and confining them between the sections of a crate, the combination with coacting press heads one of which is movable with relation to the other, of a tray upon each head for receiving and encompassing a section of the crate, an ejector member hingedly connected at one side of one of the trays and operating within the said tray, and operative connection between the other end of the said member and the other one of the press heads.

In testimony whereof we affix our signatures.

HENRY B. IRVIN.
PETE M. BONNEAU.